United States Patent [19]

Bott

[11] 4,266,708
[45] May 12, 1981

[54] VEHICLE ARTICLE CARRIER

[76] Inventor: John A. Bott, 931 Lakeshore Dr., Grosse Pointe Shores, Mich. 48236

[21] Appl. No.: 41,919

[22] Filed: May 24, 1979

Related U.S. Application Data

[63] Continuation of Ser. No. 725,500, Sep. 22, 1976, Pat. No. 4,156,497.

[51] Int. Cl.³ .............................................. B60R 9/00
[52] U.S. Cl. ...................................... 224/326; 224/324
[58] Field of Search ................ 224/326, 324, 325, 327

[56] References Cited

U.S. PATENT DOCUMENTS

| | | | |
|---|---|---|---|
| 3,856,194 | 12/1974 | Helm | 224/326 |
| 4,055,284 | 10/1977 | Bott | 224/326 |
| 4,156,497 | 5/1979 | Bott | 224/326 |
| 4,170,322 | 10/1979 | Bott | 224/326 |
| 4,182,471 | 1/1980 | Bott | 224/326 |

Primary Examiner—Steven M. Pollard
Attorney, Agent, or Firm—Harness, Dickey & Pierce

[57] ABSTRACT

An article carrier mounted on a generally flat exterior surface of an automotive vehicle and consisting of a plurality of spaced parallel slat assemblies which are fabricated, for example, of roll-formed sheet metal and are provided with fastening elements, such as tie-down members, having a body that is located at least in part within the interior of the slats; the slats being formed with openings which provide access to the fastening elements in order that containers, ropes, straps, or similar article securing devices may be cooperable with the elements in securing articles to the article carrier.

15 Claims, 12 Drawing Figures

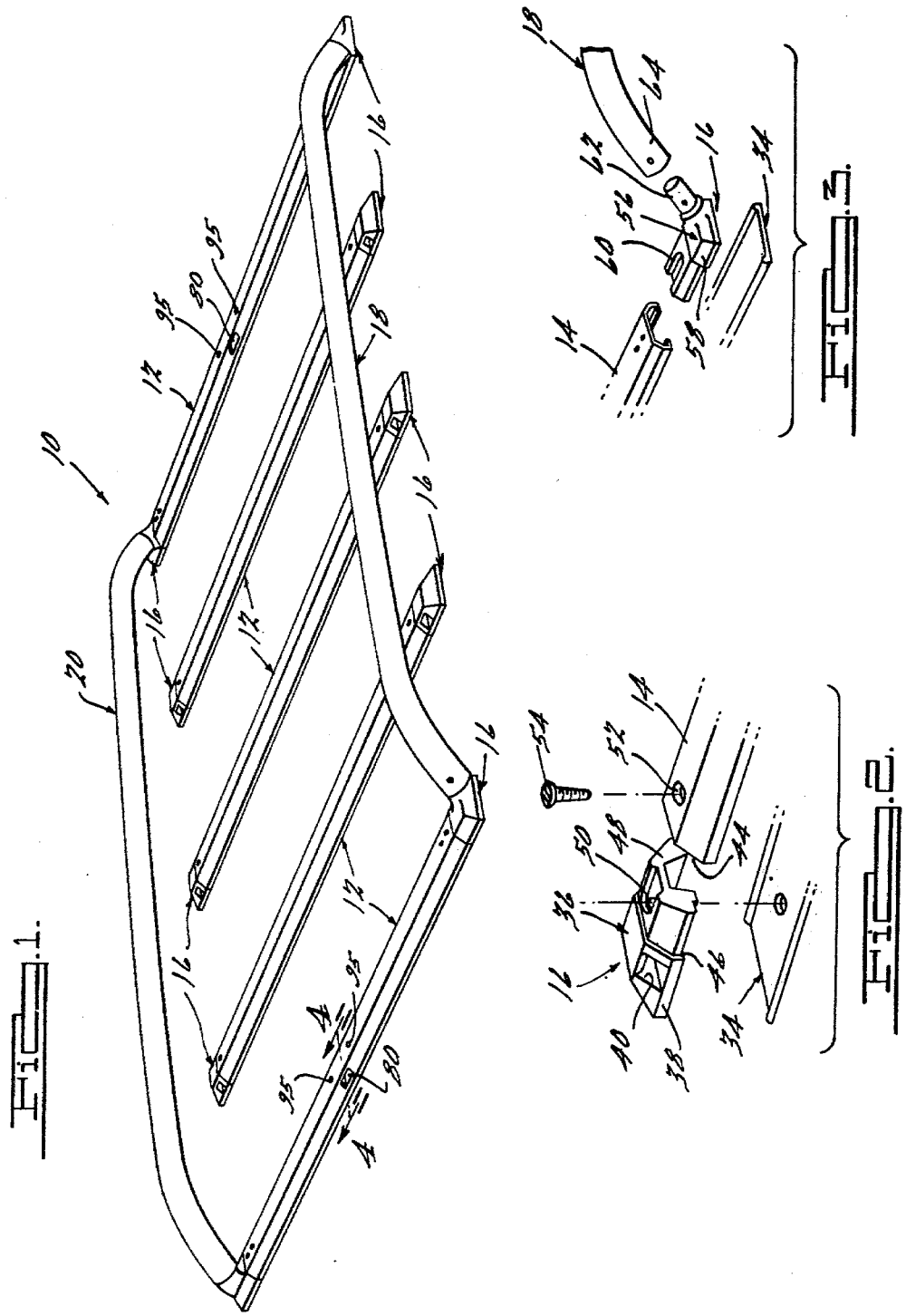

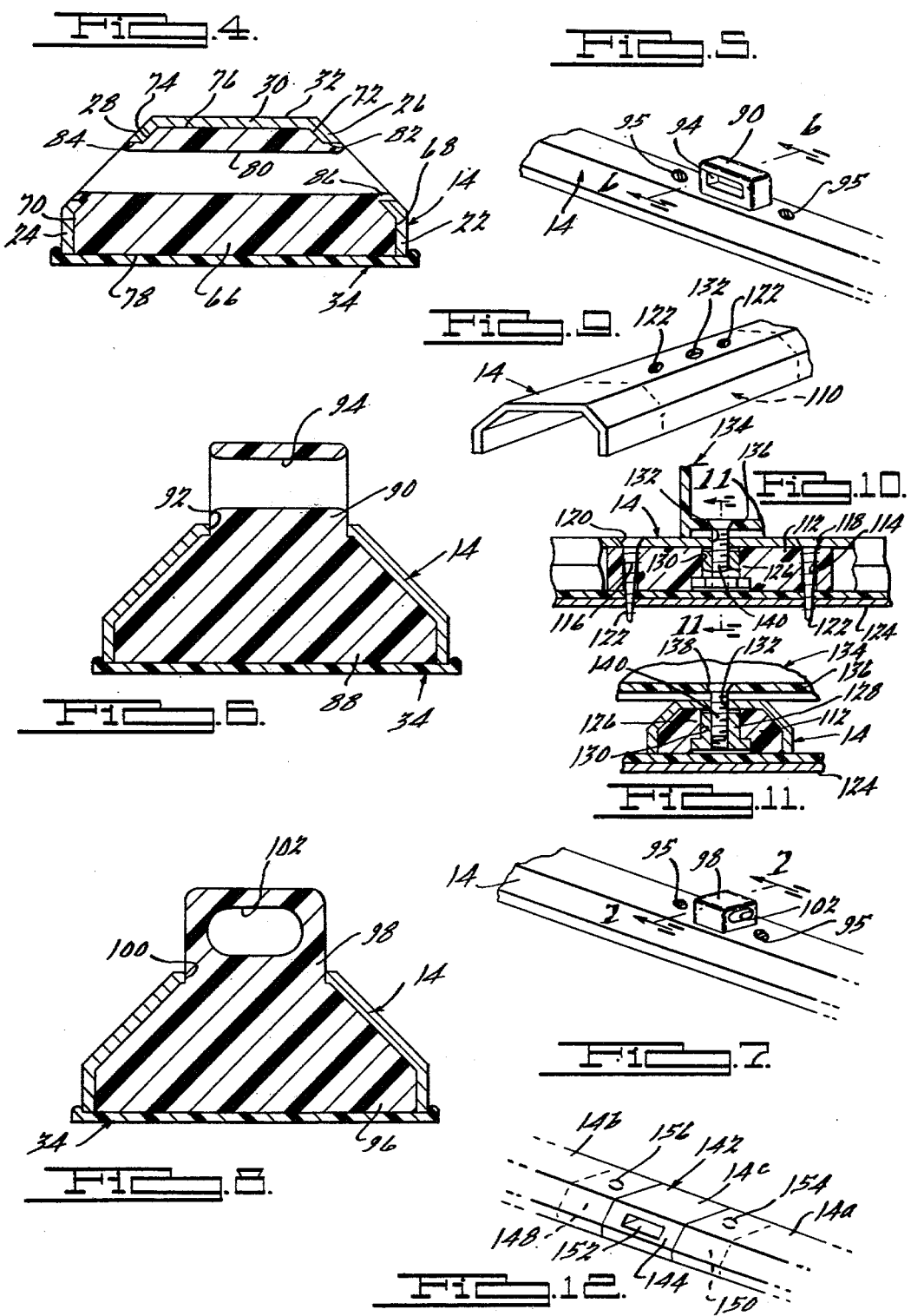

VEHICLE ARTICLE CARRIER

This is a division, of application Ser. No. 725,500, filed Sept. 22, 1976 now U.S. Pat. No. 4,156,497.

BACKGROUND OF THE INVENTION

The present invention is directed generally to fastening devices for use with article carriers for automotive vehicles. More particularly, the present invention is directed to a new and improved fastening device adapted for use with the slat assemblies of article carriers of the type shown in United States patent application Ser. No. 604,643, filed Aug. 14, 1975 now U.S. Pat. No. 4,055,284.

SUMMARY OF THE INVENTION

The article carrier of the present invention consists of a plurality of slat assemblies each of which is fabricated of a roll-formed sheet metal, such as stainless steel, and which are adapted to be mounted in spaced parallel relationship on a generally flat surface portion of an associated automotive vehicle. The slat assemblies may be provided with article or load constraining side rails and/or an article carrying container for securing articles, such as boxes, luggage, etc., upon the carrier. In accordance with the present invention, certain of the slat assemblies have openings formed therein that provide access to fastening elements which have at least part of their body portions located interiorly of the associated slat assembly. In certain embodiments of the present invention, the fastening elements include eyelet openings located completely interiorly of the slat assembly, while in other embodiments, such eyelet openings are located exteriorly of the associated slat assemblies.

BRIEF DESCRIPTION OF THE DRAWINGS

FIG. 1 is an elevated perspective view of an article carrier for an automotive vehicle and incorporating the principles of the present invention therein;

FIG. 2 is an exploded assembly view of one end of one of the slat assemblies incorporated in the article carrier shown in FIG. 1;

FIG. 3 is an exploded assembly drawing of one end of another of the slat assemblies incorporated in the article carrier of FIG. 1;

FIG. 4 is an enlarged transverse cross-sectional view taken substantially along the line 4—4 of FIG. 1;

FIG. 5 is an elevated perspective view of an alternate embodiment of a tie-down member incorporated in the article carrier of the present invention;

FIG. 6 is an enlarged transverse cross-sectional view taken substantially along the line 6—6 of FIG. 5;

FIG. 7 is an elevated perspective view similar to FIG. 5 and illustrates another embodiment of a tie-down member incorporated in the article carrier of the present invention;

FIG. 8 is an enlarged transverse cross-sectional view taken substantially along the line 8—8 of FIG. 7;

FIG. 9 is an elevated perspective view of another embodiment of the present invention;

FIG. 10 is an enlarged transverse cross-sectional view of the structure shown in FIG. 9;

FIG. 11 is a transverse cross-sectional view taken substantially along the line 11—11 of FIG. 10; and FIG. 12 is an elevated perspective view of yet another embodiment of the present invention.

DESCRIPTION OF THE PREFERRED EMBODIMENTS

Referring now in detail to the drawings and in particular to FIGS. 1-3 thereof, a vehicle article carrier 10, in accordance with one preferred embodiment of the present invention, is shown as comprising a plurality of spaced parallel slat assemblies 12 which are adapted to be fixedly secured to a substantially flat, horizontal surface portion of an associated automotive vehicle (not shown). Each of the slat assemblies 12 comprises a generally hollow roll-formed sheet metal slat 14 which is suitably secured to the associated vehicle surface and is provided with end members 16 at the opposite ends thereof. In the embodiment of the present invention illustrated in FIG. 1, the article carrier 10 includes a pair of load constraining side rails 18 and 20 which are arranged in spaced parallel relationship and extend generally perpendicular to the plurality of slat assemblies 12. As will hereinafter be described, the opposite ends of the rails, 18, 20 are secured to selected of the slat assemblies 12 via the associated end members 16, whereby to provide a unitized structure for carrying articles, such as boxes, luggage, and the like upon the associated vehicle surface.

As best seen in FIG. 4, each of the slats 14 comprises a pair of spaced parallel side walls 22, 24 which terminate at their upper edges in upwardly converging walls 26 and 28, respectively. Extending between the upper edges of the walls 26, 28 is a flat horizontally extending upper wall 30 which defines a horizontal support surface 32. The lower marginal edges of the side walls 22, 24 may be in-turned if desired (not shown) and are adapted to bear upon a suitable mounting pad, representatively designated by the numeral 34, which is coextensive of each of the slats 14 and is fabricated, for example, of a suitable resilient material, such as natural or synthetic rubber, or a suitable synthetic polymeric material.

With the exception of the end members 16 utilized in operatively supporting the side rails 18, 20, the end members 16 of the balance of the slat assemblies 12 constitute end caps 36 of the type shown in FIG. 2 and including a body 38 fabricated of a resinous plastic material, for example, by injection molding or the like. Each of the end caps 36 comprises a transversely extending opening or tiedown eyelet 40 which extends laterally therethrough and is adapted to engage the terminal end 44 of the associated slat 14 with a shoulder 46 defined around the outer periphery of a tongue portion 48 which is in turn adapted to be inserted into the interior of the associated slat 14. The tongue portion 48 is formed with a suitable central aperture 50 adapted to be aligned with a similar opening 52 within the adjacent end of the slat 14 for receiving a suitable fastening element, such as a screw, bolt, or the like 54 for operatively securing the end cap 36 within the adjacent end of the slat 14. It may be desirable to utilize a fastening element 54 of sufficient size (length) so that it may be threadably engaged directly with the portion of the associated vehicle upon which the carrier 10 is mounted, whereby such fastening element or screw 54 will serve the two-fold purpose of operatively securing the end cap 56 to the slat 14, and securing the adjacent end of the entire slat assembly 12 to the support surface, as will be appreciated by those skilled in the art and as indicated in the aforementioned copending patent application, Ser. No. 604,643.

The end members 16 operatively associated with the side rails 18, 20 are in the form of stanchion members 56, one of which is shown in detail in FIG. 3 as comprising a stanchion body 58 having a tongue portion 60 adapted to be operatively inserted into the end portion of the associated slat 14 and have suitable fastening means, such as the aforementioned fastening element 54, operatively secure the member 56 to the associated slat 14. The stanchion body 58 includes an upwardly extending, generally cylindrically shaped support portion 62 adapted to be telescopically received within the downwardly extending hollow end portion 64 of the associated side rails 18, 20, and means in the form of a suitable transversely extending screw, bolt, or the like (not shown) may be utilized for securing the side rail end portion 64 to the cylindrical stanchion portion 62, as will be appreciated by those skilled in the art.

In accordance with the principles of the present invention, it may be desirable to provide one or more of the slat assemblies 12 with intermediate tie-down devices, i.e., tie-down devices by which a suitable rope, strap, or similar securing device may be operatively secured to the slat assemblies 12, at some location thereon other than at the opposite ends thereof. Such a tie-down arrangement is best seen in FIGS. 4–8, and the embodiment shown in FIG. 4 includes a tie-down body 66 which is defined by side walls 68, 70, upwardly converging walls 72, 74, a top wall 76 and a bottom wall 78. The size and shape of the walls 68–78 are designed such that the body 66 is of the same transverse cross section as the interior of the associated slat 14. Accordingly, upon operative assembly of the body 66 into the associated slat 14, said body will assume the entire interior portion of the slat 14 along the length thereof occupied by the body 66, which length may typically be in the order of one to two inches of the overall length of the associated slat 14. The body 66 is formed with an eyelet opening 80 which is adapted to be aligned with openings 82 and 84 formed in the upwardly converging walls 26, 28 of the associated slat 14 upon assembly of the body 66 therein, whereby a suitable rope, strap, or the like may be inserted through the openings 82, 84 and eyelet opening 80 for securing said fastening device to the slat assembly 12. It is to be noted that the body 66 may be provided with a peripheral outwardly projecting portion 86 at each end of the eyelet opening 80 whereby to prevent chaffing or other undesirable wear of the securing device, i.e., rope, strap, etc., upon movement relative to the edges of the openings 82, 84 of the slat 14. One particularly important feature of the tie-down arrangement thus described resides in the fact that the entire tie-down body 66 is located interiorly of the associated slat 14, whereby to be completely concealed from view, with the exception of the eyelet openings thereof. Additionally, by virtue of being located within the slat 14, articles, such as boxes, luggage, etc., may be mounted upon the support surface 32 directly above the body 66.

FIGS. 5 and 6 illustrate an alternate embodiment of the present invention wherein a tie-down body 88 is located directly within an associated slat 14 and is intended to occupy the entire interior thereof throughout the length of the slat 14 in which the body 88 is disposed. The body 88 is provided with an integral upwardly extending portion 90 which projects through a suitable opening 92 in the top wall 30 of the associated slat 14, as illustrated in FIG. 6. The upwardly projecting portion 90 is formed with an eyelet opening 94 which is arranged generally transversely of the associated slat 14 and is adapted for cooperation with a suitable rope, strap, or similar article securing device, as will be appreciated by those skilled in the art.

As best seen in FIG. 5, means in the form of suitable threaded fastening elements 95 consisting of screws, bolts, or the like may be located on the opposite sides of the eyelet opening 94 and extend downwardly through the slat 14, the body 88, and be threadably engaged with the underlying vehicle body panel. Similar such fastening means may be utilized for securing the body 66 within the slats 12 in the embodiment of the present invention shown in FIG. 1, as indicated by the numeral 95.

FIGS. 7 and 8 illustrate a similar type tie-down arrangement wherein a tie-down body 96 is located within the slat 14 and includes an upwardly projecting portion 98 which extends through a suitable opening 100 in the top wall 30. The projecting portion 98 differs from the portion 90 in that the portion 98 is formed with an eyelet opening 102 which is arranged parallel to the length of the associated slat 14 (as opposed to transversely thereof). Suitable fastening means 95, such as the aforementioned screws, bolts, or the like, may be located on the opposite sides of the portion 98 for securing both the slat 14 and the body 96 to the underlying portion of the associated vehicle. Thus, it will be seen that the tie-down bodies may be varied in accordance with specified applications such that the eyelet openings thereof may extend either parallel or transversely of the associated slats and/or may be located above the slats or interiorly thereof, as in the case with the arrangement shown in FIG. 4. The various tie-down bodies may be fabricated of any suitable material, such as a molded plastic material, and the openings may be formed in the associated slats 14 by any convenient material forming operation, such as by a suitable stamping operation, as is well known in the art. It is to be noted that while only two of the intermediate tie-down devices are depicted in the article carrier 10 shown in FIG. 1, it will be readily appreciated that two or more such intermediate tie-down devices may be provided in any one of the slat assemblies 12, and that all of such assemblies or only certain selected ones thereof may be provided therewith, whereby to provide for universality of application in accordance with the particular type of articles to be carried.

The principles of the present invention are not limited solely to the concept of operatively associating an eyelet opening with an article carrying slat, as indicated in FIGS. 9–11, wherein a fastening element 110 is depicted for securing an article container or the like upon the associated slat, such as the aforementioned slat 14. The fastening element 110 includes a body 112 which is presumably of the same cross-sectional shape as the interior of the slat 14 and is located interiorly thereof, as best seen in FIGS. 10 and 11. The body 112 is formed with longitudinally spaced apart vertical bores 114 and 116 which are adapted to be aligned with openings or bores 118, 120, respectively, formed in the upper wall of the slat 14. With this arrangement, suitable screws, bolts, or other fastening devices 122 may extend downwardly through the aligned openings 114, 118 and 116, 120 and be threadably engaged with the underlying vehicle body panel, as designated by the numeral 124.

Disposed between the bores 114, 116 is a threaded portion, generally designated by the numeral 126. The threaded portion 126 may be provided by a variety of different means and is disclosed herein in the form of a riv-nut 128 which is cast or molded interiorly of the body 112 so as to define a vertical interiorly threaded bore 130 which is in turn vertically aligned with an opening 132 formed in the slat 114. As best seen in FIGS. 10 and 11, an article carrying container or the like representatively designated by the numeral 134 may be supported directly upon the upper side of the slat 14 (and various other slats, depending upon the size of the container). The container 134 is shown as having a bottom section 136 having an opening 138 formed therein, which opening 138 is vertically aligned with the opening 132 in the slat 14 such that a suitable fastening element 140 may extend downwardly through the openings 138, 132 and be threadably engaged with the riv-nut 128. It will be appreciated, of course, that the number of fastening elements 110 to be used with a particular container will vary with the size and shape of such container, as well as with the number and orientation of slats in a particular luggage carrier design. Accordingly, the present invention is not intended to be limited solely to the use of a single such element 110, since a multiplicity thereof may be required for containers or other types of article carriers of any substantial size.

FIG. 12 illustrates still a further embodiment of the present invention which is generally similar to the arrangement shown in FIGS. 1 and 4, but which is adapted to be utilized when two slat sections, herein designated 14a and 14b are arranged in longitudinal alignment. In particular, FIG. 12 illustrates a fastening element 142 having a body 144 which defines a central part 146 of the same general cross-sectional shape as the exterior of the slat sections 14a and 14b. The body 144 also includes a pair of outwardly extending end portions 148 and 150 which are presumably, although not necessarily, of the same transverse cross-sectional shape as the interior of the slat sections 14a and 14b and adapted to be received within the confronting ends thereof in the manner shown in FIG. 12. The central part 146 of the body 144 is formed with a transverse eyelet opening 152 which may be similar to the opening 40 previously described herein, and means in the form of suitable screws, bolts, or the like 154 and 156 may extend downwardly through the adjacent ends of the slat sections 14a and 14b, as well as through the end portions 148, 150 of the element 142 for operatively securing the entire assemblage to the underlying vehicle body panel.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. Article securing means for a motor vehicle comprising a plurality of elongated slats adapted to be secured to a surface of said motor vehicle in spaced relationship, each of said slats including spaced sidewalls and an integral upper wall extending between and interconnecting the uppermost portions of said sidewalls, said upper wall having an opening provided therein intermediate the ends of said slats, a fastening element having a body portion disposed interiorly within at least one of said slats and including tie down means extending outwardly through said opening, said tie down means being adapted to cooperate with a tie down device so as to enable articles to be secured to said motor vehicle.

2. An article securing means as set forth in claim 1 wherein said tie down means includes an eyelet opening provided therein.

3. An article securing means as set forth in claim 2 wherein said fastening element includes a surface engaging said upper wall, said surface being operative to retain said fastening element within said slat.

4. An article securing means as set forth in claim 3 wherein said fastening element has a length only slightly less than the length of said slat.

5. An article securing means as set forth in claim 2 wherein said eyelet opening extends transversely through said tie down means.

6. An article securing means as set forth in claim 5 wherein said fastening element has a transverse cross sectional shape conforming generally to the interior shape of said slat.

7. An article securing means as set forth in claim 6 wherein said tie down means is integrally formed with said fastening element.

8. An article securing means as set forth in claim 7 wherein said fastening element is fabricated from a polymeric material.

9. An article securing means as set forth in claim 1 further comprising a plurality of fastening members, each of said fastening members being operative to secure said fastener element within said slat and secure said slat to said motor vehicle.

10. An article securing means as set forth in claim 1 wherein each of said slats has a plurality of openings provided in the upper wall intermediate the ends thereof, each of said openings having tie down means projecting therethrough.

11. An article securing means as set forth in claim 10 wherein said fastening element has a length only slightly less than the length of said slats and said tie down means are integrally formed thereon.

12. An article securing means as set forth in claim 11 wherein said fastening element has a cross sectional shape conforming generally to the interior shape of said slats.

13. Article securing means for a motor vehicle comprising a plurality of elongated slats each having a pair of spaced sidewalls and an integral upper wall extending between and interconnecting the uppermost portions of said sidewalls defining a cavity within said slat, said slats being adapted to be secured to a portion of a motor vehicle in substantially parallel spaced relationship, each of said upper walls of each of said slats being provided with a plurality of spaced openings intermediate the ends thereof, tie down means projecting upwardly from each of said openings and adapted to cooperate with means for securing articles in position on said motor vehicle, said tie down means including a body portion disposed within said cavity and engaging a portion of said slat so as to retain said tie down means in position with respect to said slat.

14. An article securing means as set forth in claim 13 wherein said portion of said tie down means disposed within said cavity has a cross sectional shape conforming generally to the shape of the interior of said slat.

15. An article securing means as set forth in claim 14 wherein said portion is in the form of an elongated member of a length only slightly less than the length of said slat.

* * * * *

UNITED STATES PATENT AND TRADEMARK OFFICE
CERTIFICATE OF CORRECTION

PATENT NO. : 4,266,708
DATED : May 12, 1981
INVENTOR(S) : John A. Bott

It is certified that error appears in the above—identified patent and that said Letters Patent is hereby corrected as shown below:

On the Abstract page, under "Related to U.S. Application Data", "Continuation" should be --division--.

Signed and Sealed this

Tenth Day of November 1981

[SEAL]

Attest:

GERALD J. MOSSINGHOFF

Attesting Officer          Commissioner of Patents and Trademarks